Nov. 25, 1969 C. L. SPRINGER 3,480,935
ELECTROMAGNETIC TRANSDUCER HAVING A VARIABLE GAP WIDTH FOR RECORDING AND CHECKING SAID RECORDING
Filed Sept. 7, 1966
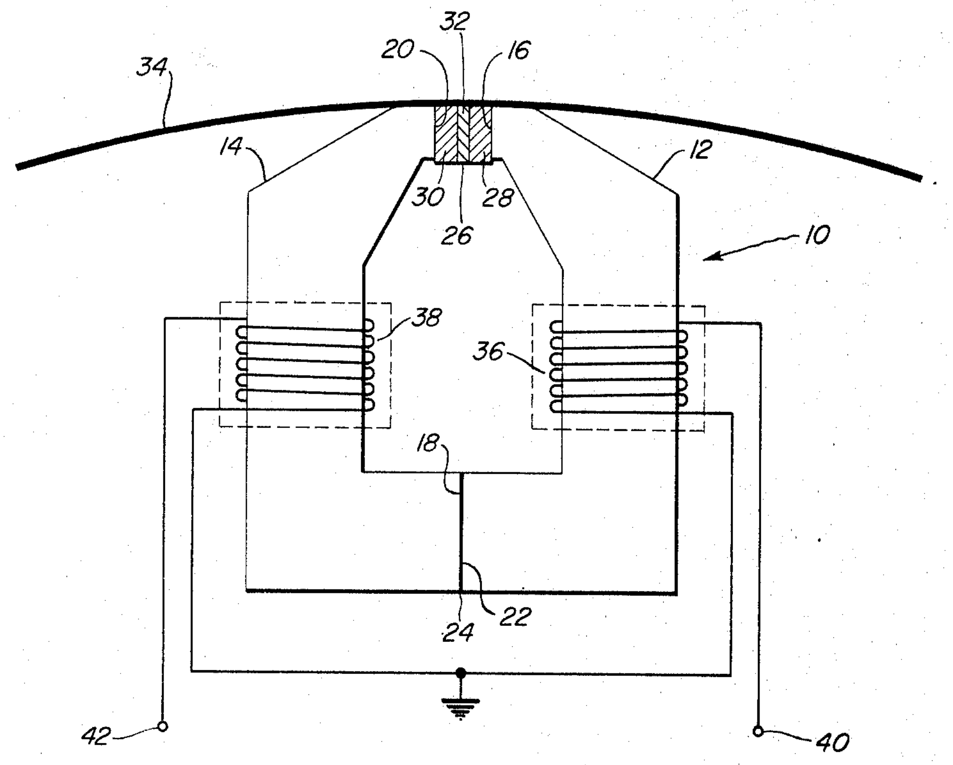
INVENTOR.
CHARLES L. SPRINGER
BY M. Michael Carpenter
ATTORNEY.

United States Patent Office 3,480,935

Patented Nov. 25, 1969

3,480,935
ELECTROMAGNETIC TRANSDUCER HAVING A VARIABLE GAP WIDTH FOR RECORDING AND CHECKING SAID RECORDING

Charles L. Springer, Denver, Colo., assignor to Honeywell Inc., Minneapolis, Minn., a corporation of Delaware Filed Sept. 7, 1966, Ser. No. 577,624
Int. Cl. G11b 5/30
U.S. Cl. 340—174.1 6 Claims

ABSTRACT OF THE DISCLOSURE

An electromagnetic transducer is shown having a core piece and a gap formed therein in which a pair of intermediate magnetic gap spacers are arranged on opposite sides of a nonmagnetic gap spacer. The intermediate gap spacers saturate at a lower level than the core piece material wherein a recording signal applied to the core piece saturates the intermediate gap spacers. The transducer thus records across a wide gap upon a contacting magnetic tape which gap includes the magnetic and nonmagentic spacers. The magnetic tape is then moved for generating a reproduce signal within a narrow gap including only the nonmagnetic gap spacer, as the intermediate gap spacers are not saturated by the lower level reproduce signal. This arrangement checks that the recording signal was actually recorded upon the tape.

The present invention relates to an improved electromagnetic transducer and, more particularly, to an improved electromagnetic transducer having a variable width gap, wherein the gap is relatively wide for recording a signal upon a web member and relatively narrow for reproducing the recorded signal therefrom.

There are several applications for the use of an electromagnetic transducer having a variable width gap in the form of a wide recording gap and narow reproducing gap. One application for such a variable width gap transducer is within a digital or incremental system. In a digital system information is recorded through the utilization of an electromagnetic pulse, known as a bit. It is often necessary or desirable to record a bit of information and then verify that recording. Many checking schemes are known in the prior art, however, few of these schemes are actually capable of verifying the fact that the information bit was properly recorded upon the web member. Most systems verify the presence of the electromagnetic pulse within the recording electronics of the digital system. The present invention, therefore, provides a means for verifying that an information bit has been properly recorded upon the web member.

Accordingly, one object of the present invention is to provide an electromagnetic transducer which is capable of verifying that proper recording of an electromagnetic pulse upon a web member has taken place.

Another object of the instant invention is to provide an electromagnetic transducer with a variable width gap.

Yet another object of this invention is to provide an electromagnetic transducer having a wide recording gap and a narrow reproducing gap.

A further object of the present invention is to provide an electromagnetic transducer with a wide recording gap and narrow reproducing gap which may be utilized within a recording system to record an electromagnetic pulse, through the use of the wide recording gap, and verify the recording thereof through the use of the narrow reproducing gap.

Other objects and many of the attendant advantages of the present invention will become readily appreciated as a better understanding thereof is obtained by reference to the following detailed description when considered in connection with the single figure of the drawing.

Referring now to the single FIGURE, a novel electromagnetic transducer, shown here a magnetic head, is illustrated generally at 10 having a pair of transducer core pieces 12 and 14. The core pieces are constructed from a magnetic material with a high relative permeability and high saturation range. Each symmetrical core piece is generally C-shaped having plane end faces oppositely arranged in confronting relationship to form the basis for a magnetic circuit. Thus, core piece 12 is provided with end faces 16 and 18 which are arranged to respectively confront end faces 20 and 22 of core piece 14. A back gap 24 is thereby formed between end faces 18 and 22, while a front gap 26, or recording gap, is formed between end faces 16 and 20. The back gap 24 provides magnetic symmetry within the magnetic circuit formed by the core pieces 12 and 14, in a manner well known in the art. The confronting end pieces 16 and 20 abut a pair of intermediate gap spacers 28 and 30 which in turn confront a nonmagnetic gap spacer 32 for completing the front gap 26.

The intermediate gap spacers 28 and 30 may be attached to the core pieces by any of several known methods, as for example bonding, plating, or vacuum depositing. In a similar manner, the nonmagnetic gap spacer 32 is also attached between the intermediate gap spacers. Within the preferred embodiment of the present invention, the spacers 28 and 30 are constructed of a magnetic material having a high relative permeability but a low saturation range with respect to the material of the core pieces 12 and 14. That is, the ratio of the saturation range of the core pieces compared to the saturation range of the intermediate gap spacers is in the order of 5 to 1; or, for example, the core pieces display an indication of saturation at 7000 gausses while the intermediate gap spacers saturate at 1500 gausses. After the nonmagnetic gap spacer 32 is inserted within the front gap 26, the surface thus formed is finished, as by grinding, to provide a tape supporting surface for a web member 34, such as a magnetic tape. The core pieces 12 and 24 are energized by a continuously connected winding in the form of a pair of serially connected input coils 36 and 38 wound in a toroidal arrangement around the central leg of each core piece. These coils effectively introduce a magnetic flux within the front gap 26 when an input signal is applied to a pair of coil input terminals 40 and 42. As a flux recorded upon the magnetic tape 34 passes across the front gap 26, the coils are electromatically driven for producing an output signal across the terminals 40 and 42 in a manner to be hereinafter described.

In operation, an input signal is applied to the coils 36 and 38 through terminals 40 and 42 for establishing a flux within the front gap 26. That is, the current, produced by the input signal, develops a magnetomotive force through the coils for establishing a flux within the core pieces. This flux, as it passes through the gap 26, is caused to leak or spread about the gap for providing the flux density which saturates the oxide coating of the magnetic tape 34 associated therewith. A flux density large enough to saturate the magnetic tape coating is also sufficient enough to saturate the magnetic material which comprises the intermediate gap spacers 28 and 30. Thus, the gap spacers, once saturated, acquire the electromagnetic features of a nonmagnetic material and combine with the nonmagnetic gap spacer 32 for forming a relatively wide gap during the application of an input signal to the magnetic head. In this manner, an input signal in the form of a recording signal may be recorded upon the magnetic tape 34 over an area which includes the combined total thickness of the intermediate gap spacers 28 and 30 and the nonmagnetic gap spacer 32.

When it is desired to produce an output signal from the magnetic head in the form of a reproduce or playback signal, the magnetic tape 34 is drawn, by suitable means not shown, passed the front gap 26. As an area of saturated oxide coating upon the tape 34 passes across the gap 26, the magnetic flux field formed thereby produce a change of flux within the core pieces for changing the magnetomotive force associated with the coils. This change thereby induces a voltage change within the coils for producing an output signal. The magnitude of the flux density thus produced is an order of one magnitude less than that produced during the recording cycle, for example 100 gauss as compared to 1500 gauss. Therefore, the intermediate gap spacers 28 and 30 are not saturated and substantially respond as part of the core pieces to establish narrow reproducing gap including only the individual thickness of the nonmagnetic gap spacer 26.

The present invention, when incorporated into a digital system, provides a novel arrangement for checking whether or not a bit of information was properly recorded. The information bit is recorded upon the magnetic tape 34, while that tape is stationary, by saturating the oxide coating thereon through the use of the wide recording gap, as described hereinabove. Once the information bit is recorded, the input signal current is removed and the reproduce electronics, not shown, are energized. The magnetic tape is then accelerated for moving it to its next position sufficiently far enough from the old position to enable the removal of the wide saturated area from the wide recording gap. As the tape is accelerated to its next record position, the wide saturated area passes the narrow reproducing gap with sufficient velocity to induce a voltage in the coils 36 and 38. The voltage is caused by the flux entering the core pieces at the innermost edges of the intermediate gap spacers 28 and 30 with only the nonmagnetic spacer 26 forming the gap, as described hereinabove. This arrangement allows the recorded bit of information to obtain the necessary minimum velocity before it crosses the narrow reproducing gap where it generates an output signal for indicating that the information bit was properly recorded. If the information bit is recorded with a fixed width gap and then reproduced by the same sized gap during tape acceleration, there will be insufficient voltage to generate a suitable output signal. This is due to the fact that, as the tape obtains the desired velocity to produce an output signal, the saturated tape area forming the information bit has moved almost completely off of the fixed width gap. The results of this arrangement is an insufficient output signal. In the present invention, the recording of the information bit in a wide gap allows a sufficient space for the tape to be accelerated to the desirable velocity before the information bit completely crosses the narrow reproducing gap. Therefore, a sufficient reproduce, or playback, voltage can be induced within the coils to generate an output signal which indicates that the information bit was properly recorded.

While the present invention has been discussed in relation to its application within a digital system, it will be obvious to those skilled in the art that other applications are possible. For example, the wide recording and narrow reproducing gap may be used to record a signal upon a web member which in turn is displaced away from the wide recording gap. If it is desired to find the recorded signal again, the narrow reproducing gap may be utilized to search for the location of the prerecorded signal. This arrangement allows the web member to be accelerated to greater velocities and, once the prerecorded signal establishes itself within the area of the narrow reproducing gap, allows the web member space to be decelerated without carrying the prerecorded information bit out of the narrow reproducing gap area.

Obviously many modifications and variations of the present invention are possible in light of the above teachings and the embodiments described hereinabove should be considered as illustrations, rather than limitations, of the present invention which, consequently, should be limited only by the attendant claims.

What is claimed is:

1. An electromagnetic transducer for recording information upon a magnetic tape and for then checking that said information is recorded, comprising: at least one core piece having end faces therein for forming a gap contacting said magnetic tape and transverse thereto, coil means disposed in relationship to said core piece for producing a flux within said gap, at least one intermediate magnetic gap spacer arranged fully within said gap, a thin nonmagnetic gap spacer arranged fully within said gap, said intermediate gap spacer having a low range of saturation compared to the saturation range of said core piece for saturating and providing a wide gap spacing when said coil means are energized by an input signal applied thereto for recording information upon a wide area of said magnetic tape, and further said intermediate gap spacer having a low range of saturation compared to the saturation range of said core piece for preventing the saturation thereof and providing a narrow gap spacer as said recorded information upon said wide area of said magnetic tape is drawn across said narrow gap for checking that said information is recorded.

2. An electromagnetic transducer as claimed in claim 1 wherein said intermediate gap spacer includes a pair of equally formed spacers symmetrically arranged on opposite sides of said nonmagnetic gap spacer within said gap.

3. An electromagnetic transducer as claimed in claim 2 wherein said core piece includes a pair of symmetrically arranged C-shaped halves oppositely disposed in confronting relationship to provide first and second gaps having said intermediate gap spacers and said nonmagnetic gap spacer disposed within said first gap.

4. An electromagnetic transducer as claimed in claim 1 wherein said core piece is formed from a magnetic material having a high permeability with a high saturation range and said intermediate gap spacer is formed from a magnetic material having a high permeability with a saturation range substantially lower than said core piece.

5. An electromagnetic transducer as claimed in claim 4 wherein the ratio of the saturation range of said core piece to the saturation range of said intermediate spacer is 5 to 1.

6. An electromagnetic transducer as claimed in claim 5 wherein said core piece saturates at 7000 gausses and said intermediate spacer saturates at 1500 gausses.

References Cited

UNITED STATES PATENTS

| | | | |
|---|---|---|---|
| 2,928,079 | 3/1960 | McNutt | 340—174.1 |
| 3,140,361 | 7/1964 | Eldridge | 340—174.1 |
| 3,171,107 | 2/1965 | Rogers | 340—174.1 |
| 2,711,945 | 6/1955 | Kornei | 179—100.2 |

STANLEY M. URYNOWICZ, Jr., Primary Examiner

V. P. CANNEY, Assistant Examiner

U.S. Cl. X.R.

179—100.2